(12) United States Patent
Favero (10) Patent No.: US 9,756,021 B2
(45) Date of Patent: Sep. 5, 2017

(54) SECURE MESSAGING (71) Applicant: Soprano Design Pty Limited, North Sydney (AU)

(72) Inventor: Richard Francis Favero, North Sydney (AU)

(73) Assignee: Soprano Design Limited, North Sydney, New South Wales (AU)

( * ) Notice: Subject to any disclaimer, the term of this patent is extended or adjusted under 35 U.S.C. 154(b) by 0 days.

(21) Appl. No.: 14/357,417

(22) PCT Filed: Nov. 12, 2012

(86) PCT No.: PCT/AU2012/001391
§ 371 (c)(1),
(2) Date: May 9, 2014

(87) PCT Pub. No.: WO2013/067601
PCT Pub. Date: May 16, 2013

(65) Prior Publication Data
US 2014/0310514 A1     Oct. 16, 2014

(30) Foreign Application Priority Data

Nov. 11, 2011 (AU) .............................. 2011904705

(51) Int. Cl.
*H04L 29/06* (2006.01)
*H04L 9/08* (2006.01)
(Continued)

(52) U.S. Cl.
CPC .......... *H04L 63/0428* (2013.01); *G06F 21/35* (2013.01); *G06F 21/43* (2013.01);
(Continued)

(58) Field of Classification Search
None
See application file for complete search history.

(56) References Cited

U.S. PATENT DOCUMENTS 6,002,769 A    12/1999  McGough
6,912,285 B2   6/2005   Jevans
(Continued)

FOREIGN PATENT DOCUMENTS

WO    WO 02052390 A2 *  7/2002

OTHER PUBLICATIONS

Patent Examination Report No. 1 for corresponding Australian Patent Application No. 2012334829, 4 pp., (Jul. 27, 2015).
(Continued)

*Primary Examiner* — Benjamin Lanier
(74) *Attorney, Agent, or Firm* — Blakely, Sokoloff, Taylor & Zafman LLP (57) ABSTRACT

A method for transmitting an encrypted message from a messaging server (106) to a handset (104) comprising the steps of receiving, at the messaging server (106) and from a sender computer (102), a message to be sent to the handset (104) and a handset identifier associated with the handset and determining that the handset is not registered with the messaging server (106) by determining that the handset identifier does not have an associated handset encryption key stored at the messaging server. The handset (104) is registered by sending a notification to the handset requesting registration, receiving back a handset encryption key associated with the handset identifier; and storing the handset encryption key against the handset identifier at the messaging server which is to be used to encrypt the received message before sending. Prior to registering the handset (104), intermediate encryption of the message may be employed to create an intermediate encrypted message to be stored at the messaging server.

17 Claims, 8 Drawing Sheets (51) Int. Cl.
*H04W 12/02* (2009.01)
*H04L 9/32* (2006.01)
*G06F 21/35* (2013.01)
*G06F 21/43* (2013.01)
*G06F 21/60* (2013.01)
*H04W 4/12* (2009.01)

(52) U.S. Cl.
CPC .......... *G06F 21/602* (2013.01); *H04L 9/0861* (2013.01); *H04L 9/0866* (2013.01); *H04L 9/0869* (2013.01); *H04L 9/3228* (2013.01); *H04L 63/0471* (2013.01); *H04L 63/083* (2013.01); *H04L 63/18* (2013.01); *H04W 12/02* (2013.01); *G06F 2221/2103* (2013.01); *G06F 2221/2107* (2013.01); *G06F 2221/2115* (2013.01); *H04L 63/0838* (2013.01); *H04L 2209/80* (2013.01); *H04W 4/12* (2013.01)

(56) References Cited

U.S. PATENT DOCUMENTS

| | | | |
|---|---|---|---|
| 7,146,009 B2* | 12/2006 | Andivahis et al. | 380/277 |
| 7,213,150 B1 | 5/2007 | Jain et al | |
| 7,272,716 B2 | 9/2007 | Haller et al. | |
| 7,685,414 B1 | 3/2010 | Appenzeller et al. | |
| 7,739,508 B2 | 6/2010 | Lord et al. | |
| 7,827,603 B1 | 11/2010 | Lan et al. | |
| 7,921,292 B1 | 4/2011 | Pauker et al. | |
| 7,996,673 B2 | 8/2011 | Ivanov et al. | |
| 8,019,085 B2 | 9/2011 | Adams et al. | |
| 8,024,574 B2 | 9/2011 | Brokenshire et al. | |
| 8,583,809 B2* | 11/2013 | Sherkin et al. | 709/229 |
| 8,682,979 B2* | 3/2014 | LeVasseur et al. | 709/206 |
| 2002/0120583 A1* | 8/2002 | Keresman et al. | 705/65 |
| 2002/0123967 A1* | 9/2002 | Wang | 705/51 |
| 2004/0008846 A1* | 1/2004 | Medvinsky | 380/278 |
| 2004/0039924 A1* | 2/2004 | Baldwin et al. | 713/189 |
| 2004/0068650 A1* | 4/2004 | Resnitzky | H04L 63/0428 713/155 |
| 2004/0202329 A1* | 10/2004 | Jung et al. | 380/273 |
| 2006/0105740 A1* | 5/2006 | Puranik | 455/410 |
| 2007/0079123 A1 | 4/2007 | Iwamura | |
| 2007/0079126 A1 | 4/2007 | Hsu et al. | |
| 2007/0130464 A1 | 6/2007 | Swedor et al. | |
| 2007/0269041 A1* | 11/2007 | Bhatnagar et al. | 380/30 |
| 2008/0044023 A1* | 2/2008 | Zorea et al. | 380/270 |
| 2008/0250245 A1 | 10/2008 | Sanderson et al. | |
| 2008/0285756 A1* | 11/2008 | Chuprov et al. | 380/277 |
| 2009/0061825 A1* | 3/2009 | Neelakantan | H04L 29/12292 455/412.1 |
| 2009/0125992 A1 | 5/2009 | Larsson et al. | |
| 2010/0017619 A1* | 1/2010 | Errico | 713/186 |
| 2010/0042519 A1* | 2/2010 | Dingler et al. | 705/30 |
| 2012/0304261 A1* | 11/2012 | Justice | 726/5 |
| 2013/0159195 A1* | 6/2013 | Kirillin et al. | 705/71 |

OTHER PUBLICATIONS

Supplementary European Search Report for corresponding European Patent Application No. 12848198, 1 pp., (Sep. 25, 2015).

* cited by examiner

SECURE MESSAGING

CROSS-REFERENCE TO RELATED APPLICATIONS

This patent application is a U.S. National Phase Application under 35 U.S.C. §371 of International Application No. PCT/AU2012/001391, filed Nov. 12, 2012, entitled SECURE MESSAGING, which claims priority to Australian Patent Application No. 2011904705, filed Nov. 11, 2011.

FIELD OF THE INVENTION

The present invention relates to secure messaging. In one form the secure messaging of the present invention relates to the transmission and receipt of encrypted messages to a handset. The invention also extends to the interim secure storage of a message on a messaging server, prior to sending the message on to a handset.

BACKGROUND OF THE INVENTION

In some circumstances the secure delivery of private information over mobile networks is desirable. An example of such private information is implied health information such as the doctor's name, time, and the specialty that may indicate a condition being treated which information forms part of appointment reminders or other information exchange with health professionals sent to patients. Banks may also wish to send private information to their customers. The ubiquity of mobile handsets has provided an effective means for the delivery of information using short message service (SMS) and other data channels.

Existing solutions that support secure messaging encrypt messages at an intermediate messaging server before forwarding the encrypted message to a smart phone. An application is typically downloaded to the smart phone (or is natively resident on the smart phone), and is used to decrypt messages that have been encrypted prior to transmission. The encryption typically uses a symmetric key encryption, for example Advanced Encryption Standard (AES) with 256 bit encryption. When this type of solution is used, the same key is used for both encryption and decryption, and is stored on both the handset and the messaging server that is used in transferring the message. This represents a risk to security should the key be compromised at either the messaging server or handset. If the messaging server or handset is hacked then the key used for some or all the handsets receiving messages from this server may be compromised and all handsets would need to be issued a new key which, considering the large number of handsets that may be supported by such a system, would represent a complicated implementation process to many handsets.

There remains a need for a solution to provide encrypted or secured messaging to handsets to securely receive messages that does not suffer from the disadvantages of existing solutions. Alternatively, or in addition, it would be desirable to provide the public with a useful choice.

Reference to any prior art in the specification is not, and should not be taken as, an acknowledgment or any form of suggestion that this prior art forms part of the common general knowledge in Australia or any other jurisdiction or that this prior art could reasonably be expected to be ascertained, understood and regarded as relevant by a person skilled in the art.

SUMMARY OF THE INVENTION

In accordance with one aspect there is provided a method for transmitting an encrypted message from a messaging server to a handset comprising the steps: receiving at the messaging server a message to be sent to the handset and a handset identifier associated with the handset from a sender computer; determining that the handset is not registered with the messaging server; facilitating the registration of the handset by:
  sending a notification to the handset requesting registration;
  receiving from the handset a handset encryption key associated with the handset identifier; and
  storing the handset encryption key against the handset identifier at the messaging server; and
encrypting the received message using the handset encryption key and sending the encrypted message to the handset.

Preferably, determining that the handset has not been registered comprises determining that the handset identifier does not have an associated handset encryption key stored at the messaging server.

It will be appreciated that the handset is to be identified by the handset identifier in the form of e.g., a MSISDN number, and that the notification and all other correspondence sent to the handset will be sent to a handset incorporating an identification card, e.g., a SIM card with the particular handset identifier.

Preferably the message received at the messaging server may be in the form of a text message, an image, video or the like.

The step of sending a notification to the handset may include notifying the user of the handset that a secure message is awaiting delivery. Optionally, the step may further include identifying the address from where a handset application is to be downloaded.

The method may further comprise performing intermediate encryption of the message to create an intermediate encrypted message and storing the intermediate encrypted message at the messaging server. The intermediate encryption may use a messaging server encryption key.

The method may further comprise decrypting the intermediate encrypted message before encrypting the message with the handset encryption key.

The step of facilitating the registration of the handset may further comprise, at the messaging server, authenticating the handset (i.e. the handset identifier or MSISDN number) prior to accepting from the handset the received handset encryption key.

The encryption key may be generated by a handset application installed on or native to the handset.

Preferably, the encryption key is a public key generated during asymmetric key generation by the handset application. The handset application may accordingly also generate an asymmetric key, namely a private key, which is stored in the handset application on the handset. The private key is used by the handset application to decrypt the encrypted message after receipt thereof.

The asymmetric keys are generated by a random number generator of the handset application, seeded by the handset's identifier, i.e. the MSISDN/mobile number of the handset. A standard asymmetric key generation algorithm is typically used.

The step of authenticating the handset may comprise:
  providing a temporary password to the handset;
  receiving a return password back from the handset; and comparing the temporary password and the return password thereby to authenticate the handset.

Preferably different communication channels are used for providing the temporary password to the handset and receiving the return password back from the handset.

The temporary password may be sent to the handset as part of an SMS, while the return password is received from the handset using a public mobile network supporting data communication.

The step of comparing the passwords may further include comparing a handset identifier received with the return password, with the handset identifier to which the temporary password was sent.

Alternatively, the step of authenticating the handset may comprise:

receiving a first temporary password from the handset;
receiving a second temporary password from the handset; and
comparing the two temporary passwords thereby to authenticate the handset.

Preferably different communication channels are used for receiving the first and second temporary password from the handset, with the one channel being a public mobile network supporting data communication and the other channel being an SMS channel.

Typically, the first temporary password is automatically transmitted over a public mobile network supporting data communication from the handset once it has been generated by the handset application program, and is transmitted with the handset identifier entered by the user through the handset application. The second temporary password is obtained along with the handset identifier as an SMS sent to the messaging server from the handset application. The SMS may be sent automatically, without user interaction, from the handset application. Typically, the handset identifier is obtained through caller identification functionality.

In accordance with another aspect there is provided a computer system comprising: a memory with instructions for performing the steps of the method as described above; and a processor configured to execute the instructions.

In accordance with a further aspect there is provided a method for registering a handset to enable the secure sending of a message to the handset, the method comprising the steps: generating, at the messaging server, a temporary password; transmitting the temporary password to the handset; receiving a return password back from the handset; comparing the temporary password with the return password; in the event that they match, transmitting an authentication acknowledgement back to the handset; and receiving a handset encryption key from the handset which is stored at the messaging server against an identification number of the handset.

In accordance with a further aspect there is provided a method for registering a handset to enable the secure sending of a message to the handset, the method comprising the steps: receiving, at the messaging server, a first temporary password from the handset through a public mobile network supporting data communication; receiving a second temporary password from the handset as part of an SMS; comparing the first and second temporary passwords with each other; in the event of a match, transmitting an authentication acknowledgement back to the handset; and receiving a handset encryption key from the handset which is stored at the messaging server against an identification number of the handset.

In accordance with a further aspect there is provided a method for transmitting an encrypted message from a messaging server to a handset comprising the steps:

receiving, at the messaging server, a message to be sent to the handset and a handset identifier associated with the handset from a sender computer;

determining that the handset is not registered with the messaging server by determining that the handset identifier does not have an associated handset encryption key stored at the messaging server;

performing intermediate encryption of the message to create an intermediate encrypted message and storing the intermediate encrypted message at the messaging server;

facilitating the registration of the handset;
after registration, obtaining a handset encryption key from the handset;
decrypting the stored intermediate encrypted message; and
encrypting the message with the handset encryption key prior to sending the encrypted message to the handset.

As used herein, except where the context requires otherwise, the term "comprise" and variations of the term, such as "comprising", "comprises" and "comprised", are not intended to exclude further additives, components, integers or steps.

Further aspects of the present invention and further embodiments of the aspects described in the preceding paragraphs will become apparent from the following description, given by way of example and with reference to the accompanying drawings.

DETAILED DESCRIPTION OF THE EMBODIMENTS

1. System Overview

Figure 1:
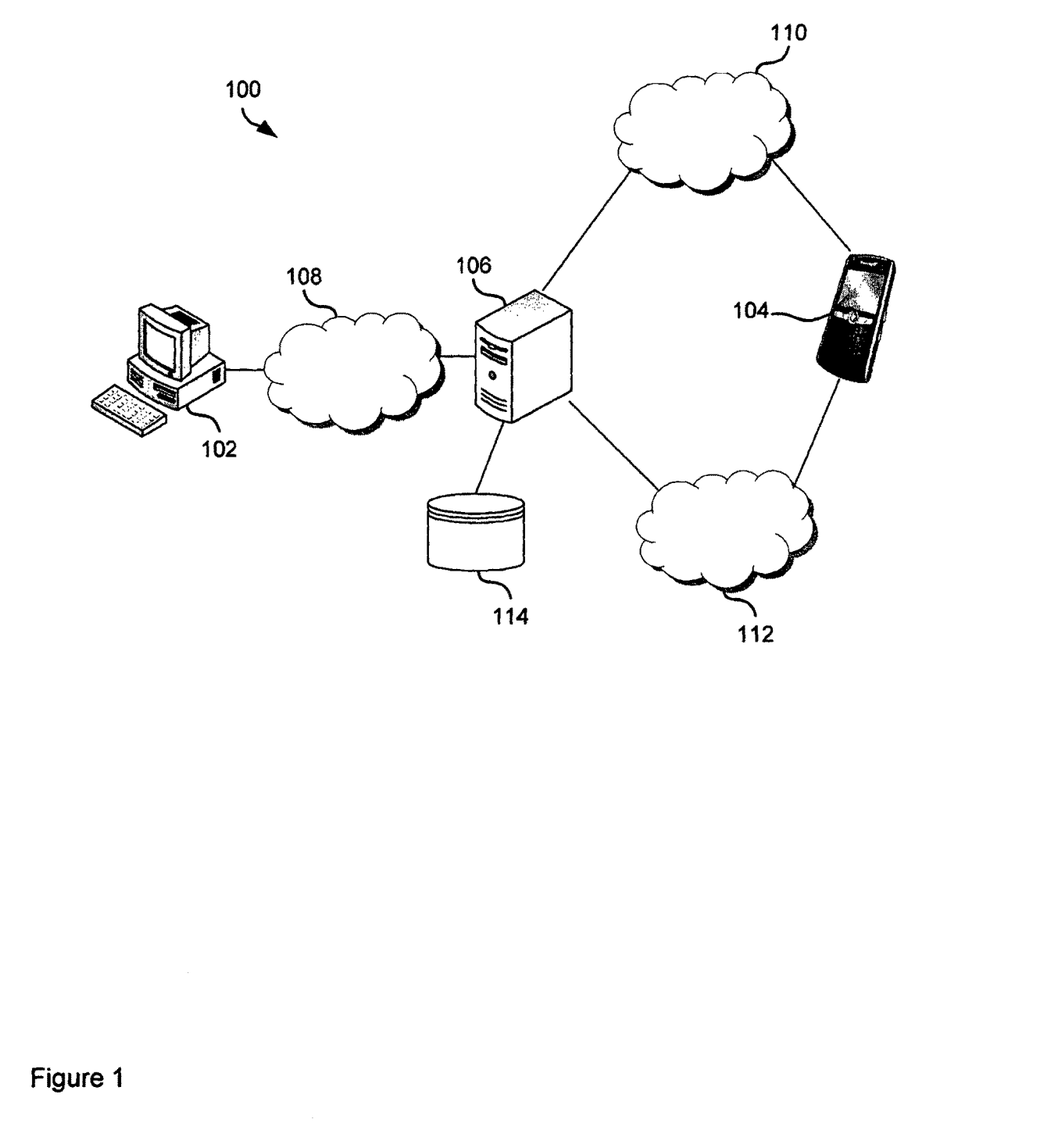
FIG. 1 is a schematic diagram of a secure messaging system including a messaging server and a handset.

FIG. 1 is a schematic diagram of a secure messaging system 100 for sending secure messages from a sender computer 102 to a recipient handset 104 via a messaging server 106. Communication between the sender computer 102 and the messaging server 106 is over a network 108 that may be a private or a public data network (for example, the computer may use a web application accessed via a website, and using an HTTP or HTTPS connection). Communication between the messaging server 106 and the handset 104 is over both a public mobile network 110 that supports the sending/receiving of SMS (Short Message System) messages and over a public mobile network 112 that supports data communication using, for example, a 3G or 4G communication protocol. The messaging server 106 interfaces with one or more storage devices 114 used, amongst others, for maintaining a database with information about registered users (recipients). The database stored on the storage device 114 may also be used for storing messages received from one or more senders before being forwarded to one or more recipients. In one embodiment the messages being stored on the database may be encrypted (secured).

The sender computer 102 and messaging server 106 both include hardware components such as a processor, memory, storage and a network interface. The sender computer 102 and messaging server 106 may also include input-output interfaces (such as a keyboard and monitor). Standard hardware of the sender computer 102 and the messaging server 106 also includes a bus for communication between hardware components. The computer hardware operates with a software component of a secure messaging application (described in further detail below), which application is stored in the memory and is executed by the processor of each machine. The messaging server 106 interfaces with the one or more storage devices 114 which may also comprise a hard disk, a RAID system or other direct-attached storage.

It will be appreciated that there are many different possible computer architectures that may be used to implement the present invention and that the foregoing description is representative of only one example architecture. The term 'computer' is used herein in a general sense and includes, without limitation, the computational devices of personal computers, personal digital assistants, smart phones, tablet computers and servers. Those skilled in the relevant arts will recognise which of these classes of computer can be used for each aspect of the system 100. For example, personal digital assistants, smart phones and tablet computers may be suitable alternatives to the sender computer 102 shown in FIG. 1.

The handset 104 is the type of handset that is able to receive SMS messages and is also able to communicate over a data network such as a 3G or 4G network. Suitable handsets include, for example, personal digital assistants, smart phones, tablet computers, or the like.

2. Handset Application

The system 100 supports the sending of secure messages from the sender computer 102 to the recipient handset 104 via the messaging server 106, both when the recipient is prior registered with the messaging server 106 and also when the recipient is not prior registered with the messaging server 106. If a recipient is not registered, it means that the messaging server 106 does not have encryption credentials of the recipient handset 104 (namely a handset encryption key such as a handset public key), which typically means that the recipient handset 104 has not activated a handset application. The handset application is used for registration of the recipient handset 104, for generating encryption/decryption keys and for decrypting secured short messages received from the messaging server 106.

For a recipient to register with the messaging server 106 the handset application on the handset 104 sends a handset encryption key to the messaging server 106, and the key is then stored at the messaging server (on the server memory and/or on the server storage device 114) for use when a message needs to be sent to the particular handset. To do this, the recipient handset 104 installs a handset application and configures the handset application for receiving secure messages. Configuring the handset application so that the recipient handset 104 is registered and allowed to decrypt messages may further entail, for example, authenticating the handset 104 by matching the handset's handset identifier in the form of the mobile number/MSISDN number associated with the handset and verifying a temporary password such as a one time password (OTP). Additionally, configuration includes the creation of encryption and decryption keys used for messages sent to the handset 104. As used herein the terms "authenticating" and "validating" are used interchangeably to describe the comparison between the password sent the identifier of a handset and the password entered by a user of the handset.

Additionally, a person skilled in the art will appreciate that a handset is always to be identified by a handset identifier in the form of e.g., a MSISDN number, and that notifications and all other correspondence will be sent to a handset incorporating an identification card, e.g., a SIM card, with the particular handset identifier.

The handset application is a client application running on the handset 104 which application is obtained by the recipient, for example, from an application store. Such application stores may include handset-specific stores such as Apple, Android, Windows, Blackberry or J2ME application stores. The functionality provided by the handset application includes providing authentication and registration of the recipient handset 104 at the messaging server 106, and supporting secure messaging between the messaging server 106 and the handset 104 by a) generating and providing an encryption key to the messaging server 106, and b) providing the application layer for SMS and data (e.g. 3G) communication between the messaging server 106 and the handset 104 over the public mobile networks 110, 112. It will be appreciated that the handset application may also be native to the handset by being pre-installed on the handset 104.

a. Authentication and Registration

Figure 2:
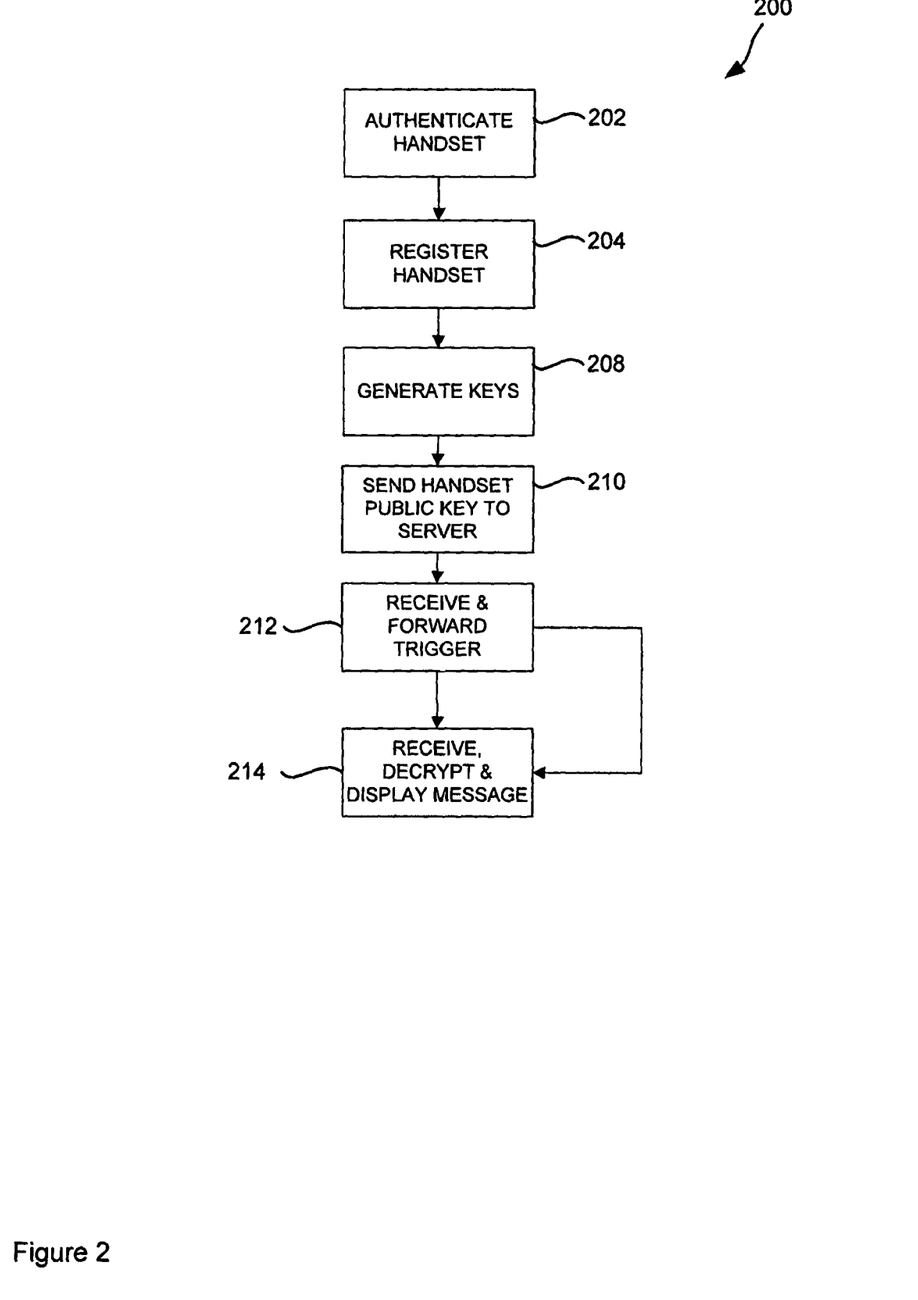
FIG. 2 is a flow diagram of the overall functions performed by a handset application of the handset of FIG. 1

FIG. 2 shows a flow diagram 200 of the overall functions performed by the handset application. Once the handset application has been installed on the handset 104, the handset application at step 202 authenticates the handset 104.

During the authentication process, pairs of temporary passwords and mobile numbers are compared and if these pairs match, the handset application is able to authenticate the recipient handset 104 with the messaging server 106, and the handset 104 is then also registered with the messaging server 106 (see step 204). Preferably, the temporary passwords are to be received through separate communication channels. The registration data for the handset 104 that the messaging server 106 maintains includes the handset 104 identifier, i.e. the mobile number (MSISDN number) associated with the handset, the device type (such as the type of smart phone) as well as the public encryption key that the handset application sends to the messaging server 106.

More detailed functions performed by the handset 104 during the registration process are now discussed with reference to FIGS. 3 and 4.

Figure 3:
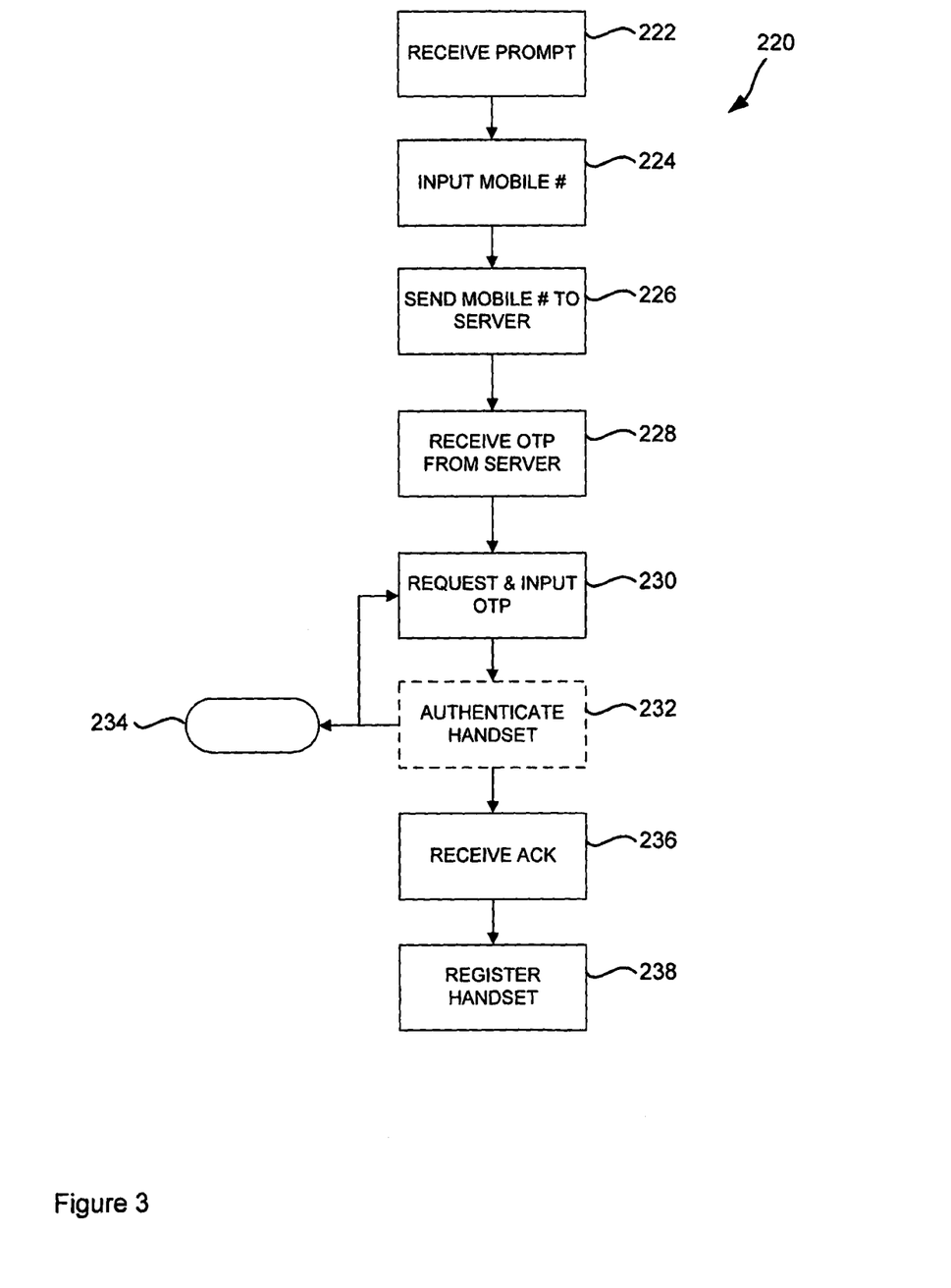
FIG. 3 is a flow diagram of one example of registration functions of the handset of FIG. 1 forming part of the flow diagram of FIG. 2.

Turning first to FIG. 3, a registration process 220 is described where a temporary password is generated at the messaging server 106. At step 222 the handset application is prompted to request from the user the handset identifier, i.e. the mobile number (MSISDN). The handset application obtains the mobile number associated with the handset 104 from the handset user who enters the number via the application user interface (e.g. a graphical user interface (GUI)), as shown by step 224. The handset application then sends the mobile number, for example via an HTTP or an HTTPS connection, to the messaging server 106 at step 226. At step 228 the messaging server 106 generates a temporary password, in the form of a one time password (OTP) that is associated with the mobile number of the handset 104. The OTP may be a character string that is randomly created by the messaging server 106. It will be understood that the length and character composition may be configured in a number of different ways, so that the OTP may be an alphanumeric string of any length. In one embodiment the OTP contains 6 numbers. The OTP is valid for a limited period of time, for example five minutes, one hour, one day, or one week.

The messaging server 106 sends a copy of the OTP to the handset 104 by sending an SMS to the handset's identifier (e.g. to the MSISDN/mobile number of the handset). A single identifier may be used to register multiple portable devices (for example an iPhone and an associated iPad) so that the multiple portable devices may be used to view secure messages sent to the one identifier.

At step 230 the handset application prompts the user of the handset 104 to enter the OTP (which the messaging server 106 has sent to the mobile number of the handset 104) via the handset application user interface.

The handset application sends the entered OTP to the messaging server 106 via an HTTP or an HTTPS connection. The messaging server 106 then compares the required mobile number/OTP pair with the mobile number/OTP pair entered by the user.

The authentication process is performed at step 232 which is indicated in broken lines in FIG. 3, as this step is performed at the messaging server 106. If the mobile number/OTP pairs do not match, the handset application may provide the user with an opportunity to re-enter an OTP. If the pairs again do not match the handset application may be configured to inform the messaging server 106 that the handset 104 cannot be authenticated or registered and the application terminates (step 234).

If the pairs do match, the handset is authenticated and an acknowledgement is sent to the handset application at step 236. Registration of the handset 104 then follows at step 238, which is the same registration step 204 shown in FIG. 2.

In one variation of this embodiment, the authentication occurs at the handset. In this scenario, in addition to the OTP that is sent to the handset via SMS, the messaging server 106 also sends the OTP to the handset application using an HTTP or HTTPS connection. The handset application then has two copies of the OTP, one received via SMS and one received via HTTP or HTTPS connection, i.e. via different communication channels. The handset application now authenticates the handset by comparing the OTPs received thereby validating the handset.

Figure 4:
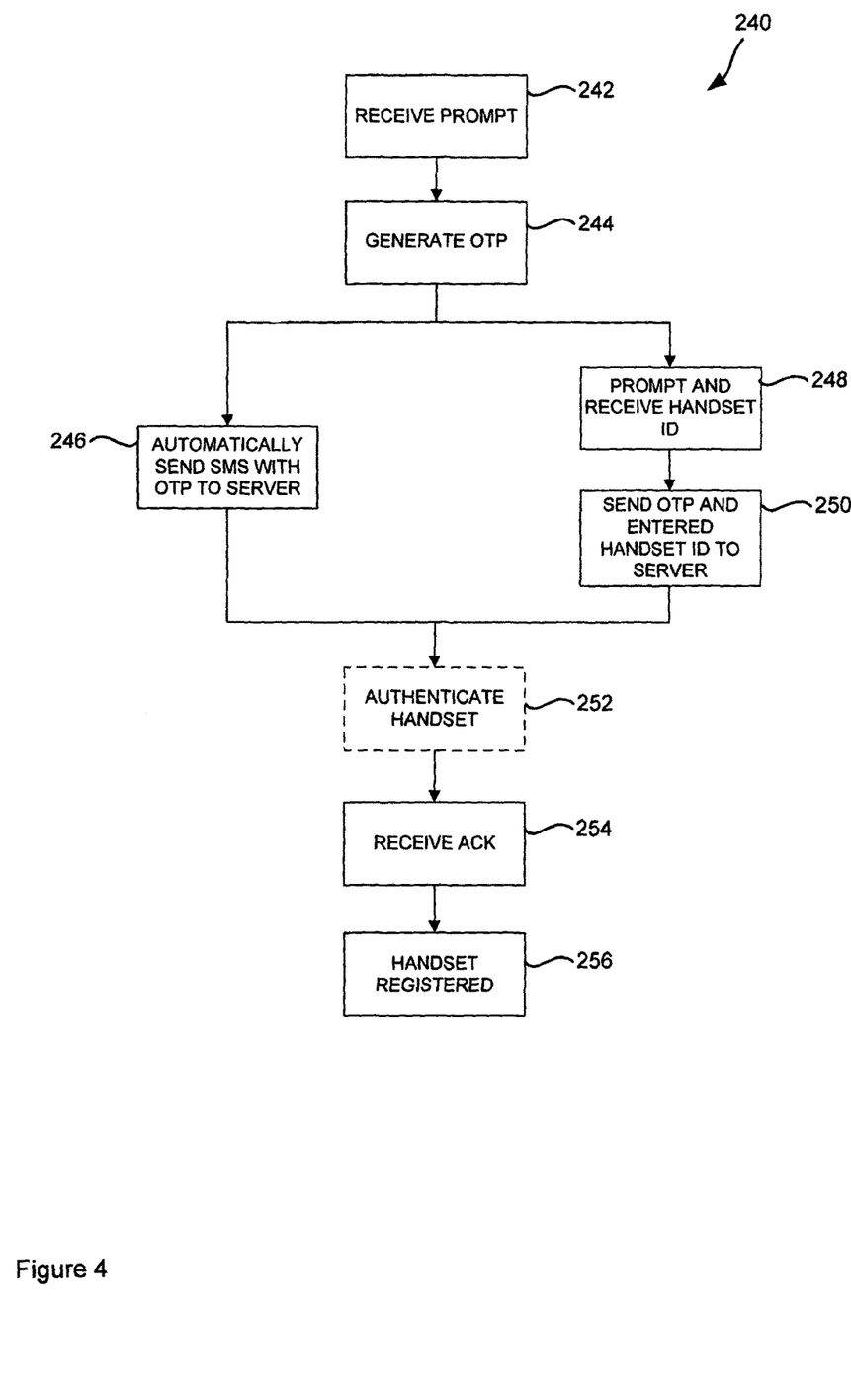
FIG. 4 is a flow diagram of another example of registration functions of the handset of FIG. 1 forming part of the flow diagram of FIG. 2.

With reference now to FIG. 4, an alternative registration process 240 is described where a temporary password is generated at the handset application 104. At step 242 the handset application is prompted to start the registration process. The handset application generates, at the handset 104, an OTP (step 244). The OTP may have similar features as described above with reference to FIG. 3. In response to the prompt, the handset application is also configured to get the handset to send an SMS containing the OTP to the messaging server 106, as shown by step 246. This SMS is in effect an automatic SMS, requiring no user input. By using inherent "caller identification" functionality of the SMS message, the messaging server 106 is able to obtain the mobile number (MSISDN) of the handset from the SMS. The OTP is also extracted from the SMS message. At step 248 the handset application prompts the user of the handset 104 to enter the handset identifier (mobile number), which number is sent, with the OTP, over a public mobile network supporting data communication, such as a HTTP or HTTPS connection, to the messaging server 106 (see step 250).

Similar to the process shown in FIG. 3, the authentication process is performed at step 252, again indicated in broken lines as this step is performed at the messaging server 106. If the mobile number/OTP pairs do match, the handset 104 is authenticated and an acknowledgement is sent to the handset application at step 254. Registration of the handset 104 then follows at step 256, which is the same registration step 204 shown in FIG. 2.

b. Generating Encryption/Decryption Keys

Returning now to the functions after the registration step 204 in FIG. 2, the handset application is shown to be configured to generate encryption and decryption keys. A new and separate key is created for each handset based on that handset's mobile number which is used to seed a random number generator. This means that if the handset application is hacked and one private key is compromised, then only one handset is affected.

At step 208 the handset application generates the encryption key and the decryption key associated with the handset 104. The handset's mobile number (MSISDN) is used by the handset application to seed a random number generator to generate the keys. In one embodiment, the encryption is asymmetric and the keys are RSA 1024 keys. In another embodiment, if the handset 104 has the computing power to support the key length of an RSA 2048 key, then the keys are RSA 2048 keys. It will be understood that there are several types of encryption that may be used. It will be appreciated that the encryption key length will increase over time as computer power improves.

When asymmetric encryption is used, then the encryption key is referred to as a public key, and the decryption key is referred to as a private key. After generating the keys, the handset application sends the public key to the messaging server 106 (step 210), preferably through the handset application using a secure channel such as HTTPS, and does not share the private key. The handset's public key will then be used by the messaging server 106 to encrypt all messages going to that specific handset 104. The private key will be stored in the handset application on the recipient's handset 104 and used by the handset application to decrypt the messages sent to the handset 104 from the messaging server 106 via the handset application.

c. Server/Handset Communication

If a message is received by the messaging server 106 from the sender computer 102 for which the destination is the recipient handset 104, then the messaging server 106 sends an SMS message to the handset to notify the handset 104 of the message that is waiting. This communication happens via the public mobile network 110 that supports SMS messaging. Once the recipient has seen the SMS message, then the recipient will know to access the handset application in order to view the waiting secured message. Alternatively, the handset application may be automatically opened by way of a particular handset configuration. The handset application provides the application layer for the network connection between the messaging server 106 and the recipient handset 104 over the data (e.g. 3G) public mobile network 112. The handset application provides a user interface where messages that have been received from the messaging server (e.g. via an HTTP or HTTPS connection) are displayed so that the recipient can view them.

The handset application also provides a user interface that the recipient can use to send a reply to the message. Replies from the handset 104 to the messaging server 106 may use a communication protocol such as HTTP, HTTPS, SMPP, email, WSDL, etc. In some embodiments the messaging server 106 forwards the reply messages to the sender computer 102.

In one embodiment, when the recipient performs one of: starting the handset application, opening the handset application inbox, refreshing the handset application inbox or selecting a listed message in the handset application inbox, then the handset application is triggered to contact the messaging server 106 (step 212) and to perform the following at step 214:

retrieve one or more yet to be received encrypted messages from the server 106;

decrypt the message; and display the message on the handset application user interface for the recipient to view the message.

The encrypted message that is received has been encrypted by the server 106 using the handset public key. A copy of this encrypted message remains on the messaging server 106 after the encrypted message has been sent to the handset. The copy of the message may remain on the server for a predetermined period of time (e.g. one day), or the copy of the message may be saved in the storage 114 for a longer period of time (e.g. one week, or until the user requests the server to remove the copy of the message). It will be understood that management and storage of the messages at the server 106 may be performed in any number of ways, for example depending on the amount of memory or storage used by the server or the type of service provided to the recipient.

3. Message Flow Between Sender, Messaging Server and Recipient

Figure 5:
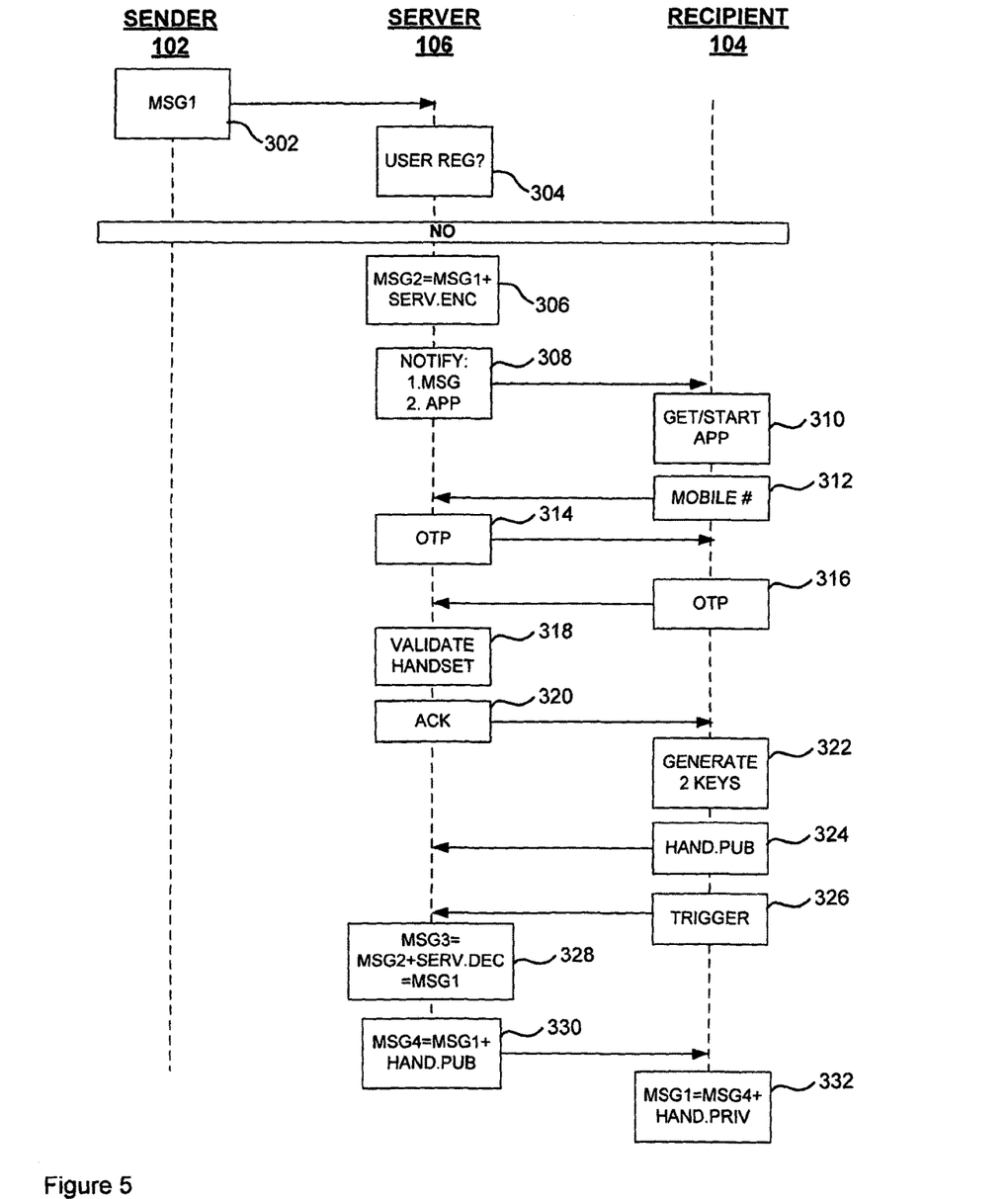
FIG. 5 is a representation of the message flow from sender to recipient when the recipient is not prior registered, in accordance with the registration functions of the example embodiment of FIG. 3.
Figure 6:
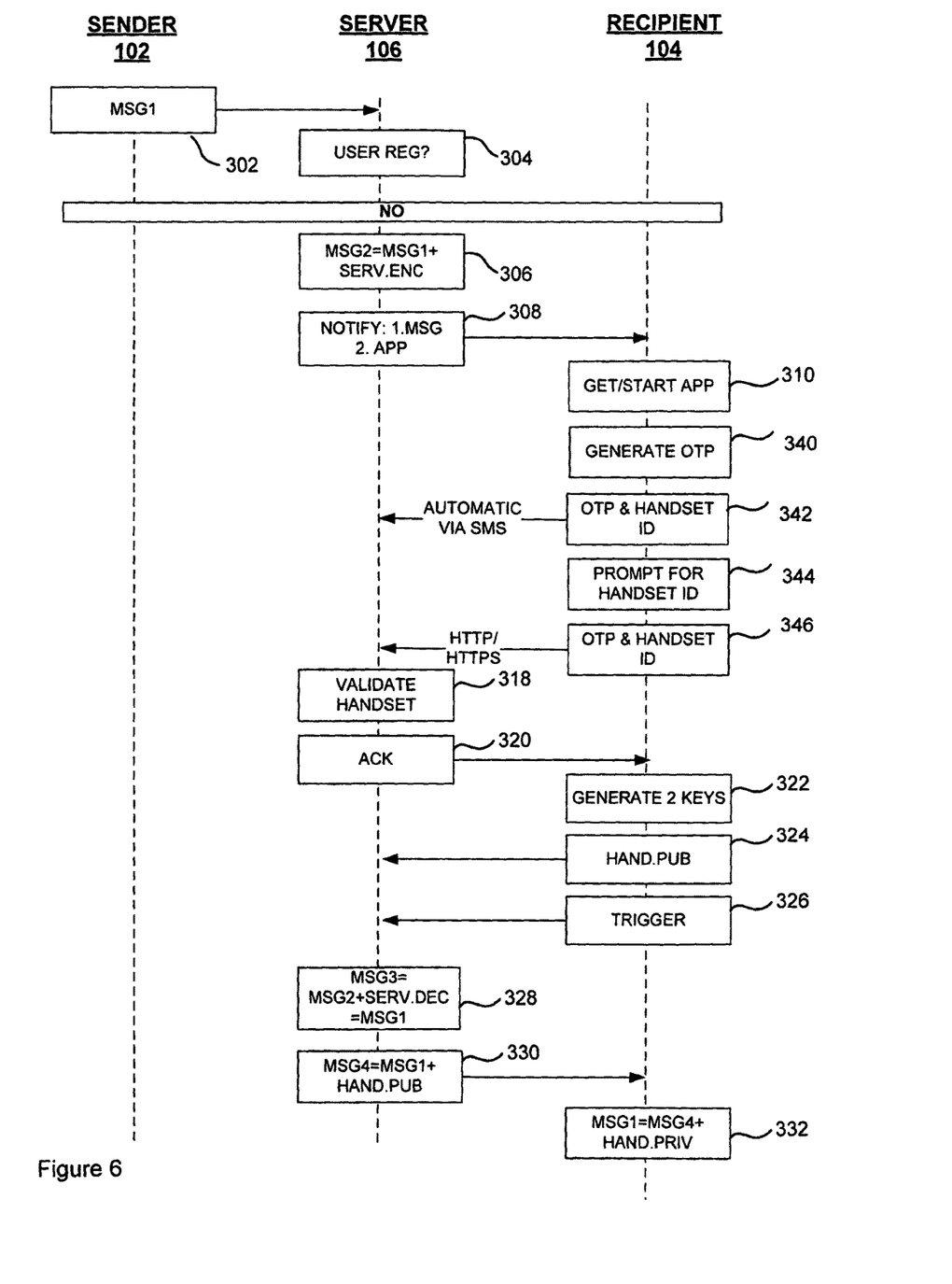
FIG. 6 is a representation of the message flow from sender to recipient when the recipient is not prior registered, in accordance with the registration functions of the example embodiment of FIG. 4.
Figure 7:
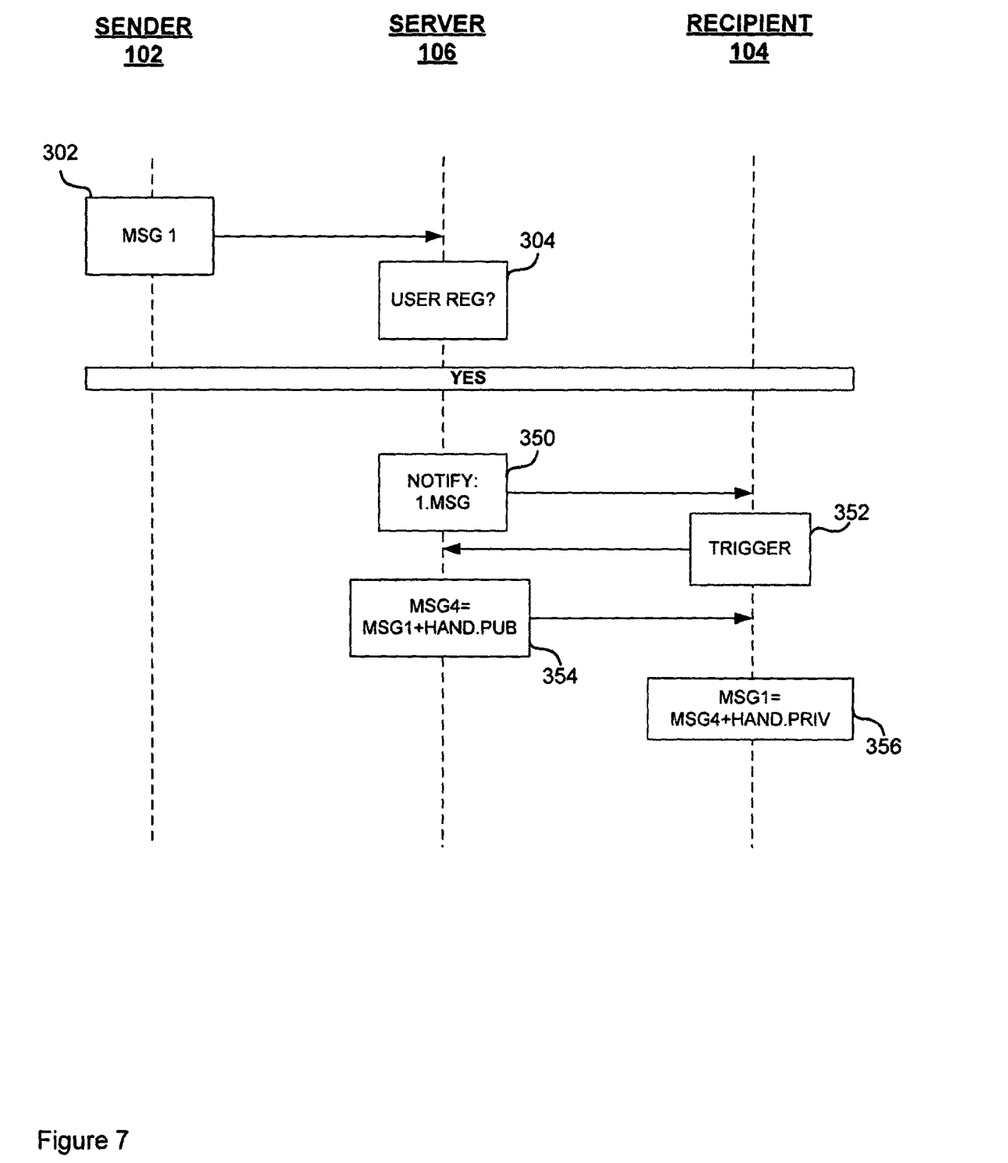
FIG. 7 is a representation of the message flow from sender to recipient when the recipient is prior registered.

FIGS. 5 to 7 represent the message flow from the sender computer 102 to the recipient handset 104 via the messaging server 106 when the recipient is not prior registered (FIGS. 5 and 6), and when the recipient is prior registered (FIG. 7).

Referring firstly to FIG. 5, which shows the communication in terms of the functionality of the handset application described above with reference to FIGS. 2 and 3, at step 302 the sender computer 102 uses a customer application to send a message ('Msg1') to the messaging server 106 that is to be delivered encrypted to the handset 104. The sender computer 102 sends the message Msg1 together with a handset identifier to the server 106. As mentioned above, the handset identifier may be a public network address such as a directory number for a mobile handset using a national numbering plan for mobile phones (e.g. an MSISDN mobile number).

The messaging server 106 determines whether the handset is registered at step 304 by checking the registration database 114 to determine whether there is a handset encryption key (such as a handset public key) associated with the identifier (e.g. public network address) of the handset 104.

For the scenario shown in FIG. 5, the handset 104 is not registered at this stage, in other words the messaging server 106 does not have an encryption key to use for forwarding an encrypted message to the handset 104. At step 306 the messaging server 106 therefore encrypts the received message ('Msg1') temporarily on the platform using a messaging server encryption, key ('serv.enc'). The encrypted message ('Msg2') is stored on the server 106 and/or on the server's storage 114. Therefore, in this embodiment, the received message Msg1 is not stored on the server 104.

This intermediate encryption may be symmetric or asymmetric encryption. Examples of types of encryption that may be used include RSA with key length 1024, RSA with key length 2048 or AES with key length 256.

At step 308 the messaging server 106 sends a notification to the handset 104 indicating that there is an encrypted message waiting and providing details for downloading the required handset application, for example by providing a hyperlink to a website of an application store. In one embodiment this notification is sent via SMS.

In another embodiment, the notification step 308 may precede the intermediate encryption step 306.

At step 310 the user downloads and installs the handset application from the appropriate application store. If the handset application is already on the handset (for example if the user has previously downloaded it or if it is preinstalled on the handset), or alternatively, after the user has now downloaded the handset application, the user then starts the handset application on the handset 104 and, on being prompted, enters the handset's mobile number using the handset application user interface.

After the handset application has forwarded the entered mobile number to the messaging server 106 as described above (step 312), then the messaging server 106 generates and sends an OTP to the handset 104 via SMS at step 314.

The user provides the OTP to the handset application in order to validate the handset 104. In the embodiment shown in FIG. 5, the handset application prompts the user for the OTP and then sends the user entered OTP to the server 106 (step 316). The server 106 then compares the required mobile number/OTP pair with the mobile number/OTP pair entered by the user, noting that only the OTP was entered by the user but that the application would have sent the mobile number of the handset with the OTP to the messaging server 106. If the pairs match, then the server 106 authenticates the recipient handset with the server 106 (see step 318), and the handset 104 is then also registered with the server 106. Typically, an acknowledgement of authentication will be sent to the handset application (step 320).

In another-embodiment (not shown) the messaging server 106 may send the OTP to the handset application and the application then compares the mobile number/OTP pair required by the server with the mobile number/OTP pair entered by the user.

At step 322 the handset application creates a handset public key and handset private key for the handset 104. At step 324 the handset application provides the handset public key to the messaging server 106. At this step other data may also be sent from the handset application to the server 106 (for example data regarding the device type) that will be saved on the server storage 114 together with other registration data pertaining to the specific handset. In one embodiment the registration data is maintained on the server storage 114 for future use, so that if a second message needs to be sent to the handset 104, the handset 104 will be determined to already be registered so that the second message can be a) encrypted using the saved handset public key and b) securely sent to the handset 104.

In one embodiment, when the user opens the handset application inbox to retrieve the secured message this provides a trigger (or pull) to the handset application to send a request to the messaging server 106 in order to prompt the messaging server 106 to send the message. This is shown at step 326.

At step 328 the messaging server 106 decrypts the intermediate encrypted message Msg2 using the messaging server decryption key. At step 330 the messaging server 106 encrypts the message using the handset public key and this encrypted message ('Msg4') is delivered to the handset application. In one embodiment, the encrypted message Msg4 is also stored on the database.

At step 332 the handset application decrypts the message using the handset private key and displays the message on the application user interface for the recipient to view.

Referring now to FIG. 6, communication in terms of the functionality of the handset application described above with reference to FIGS. 2 and 4, is shown. As only the steps of authentication differ between the communication processes described in terms of FIGS. 5 and 6, the same reference numerals have been used for steps that are the same and a description of these steps are not repeated below.

Starting thus from step 310 in FIG. 6, the user downloads and installs the handset application from the appropriate application store.

At step 340, the handset application generates an OTP. The handset application is configured to get the handset 104 automatically to send, i.e. without user input, an SMS message to the messaging server 106 (step 342), containing the generated OTP. At step 344, the handset application prompts the user to enter the user's mobile number (i.e. the handset ID), which is sent by the handset application, together with the generated OTP, via the private or public data network 112 (e.g., via an HTTP or HTTPS connection) to the messaging server 106 (see step 346).

It will be appreciated that the OTP is again sent via different communication channels from the handset to the messaging server 106.

On receipt of the SMS message, the messaging server 106 obtains the handset identifier through caller identification functionality from the SMS. Similar to the communication process described above with reference to FIG. 5, the server 106 compares the mobile number/OTP pairs and if the pairs match, authentication and registration follow.

Referring to FIG. 7, at step 302 the sender computer 102 uses a customer application to send a message ('Msg1') to the messaging server 106 that is to be delivered encrypted to the handset 104. The messaging server 106 determines whether the handset is registered at step 304. For the scenario shown in FIG. 7, the handset 104 is already registered at this stage and the messaging server 106 therefore has the handset's public key.

At step 350 the messaging server 106 sends a notification via SMS to the handset that indicates that there is a message waiting to be delivered.

In one embodiment, when the user opens the handset application inbox to retrieve the secured message this provides a trigger (or pull) to the handset application to send a request to the messaging server 106 in order to prompt the messaging server 106 to send the message. This is shown at step 352.

At step 354 the messaging server 106 encrypts the message using the handset public key and this encrypted message ('Msg4') is delivered to the handset application. In another embodiment the messaging server 106 encrypts the message using the handset public key to generate the encrypted message Msg4 before the handset 104 is notified, and this encrypted message Msg4 is stored on the messaging server 106 and/or the messaging server's storage 114 until the messaging server 106 is prompted by the trigger (step 356) to send the encrypted message Msg4 to the handset 104.

4. Functions Performed by the Messaging Server

Figure 8:
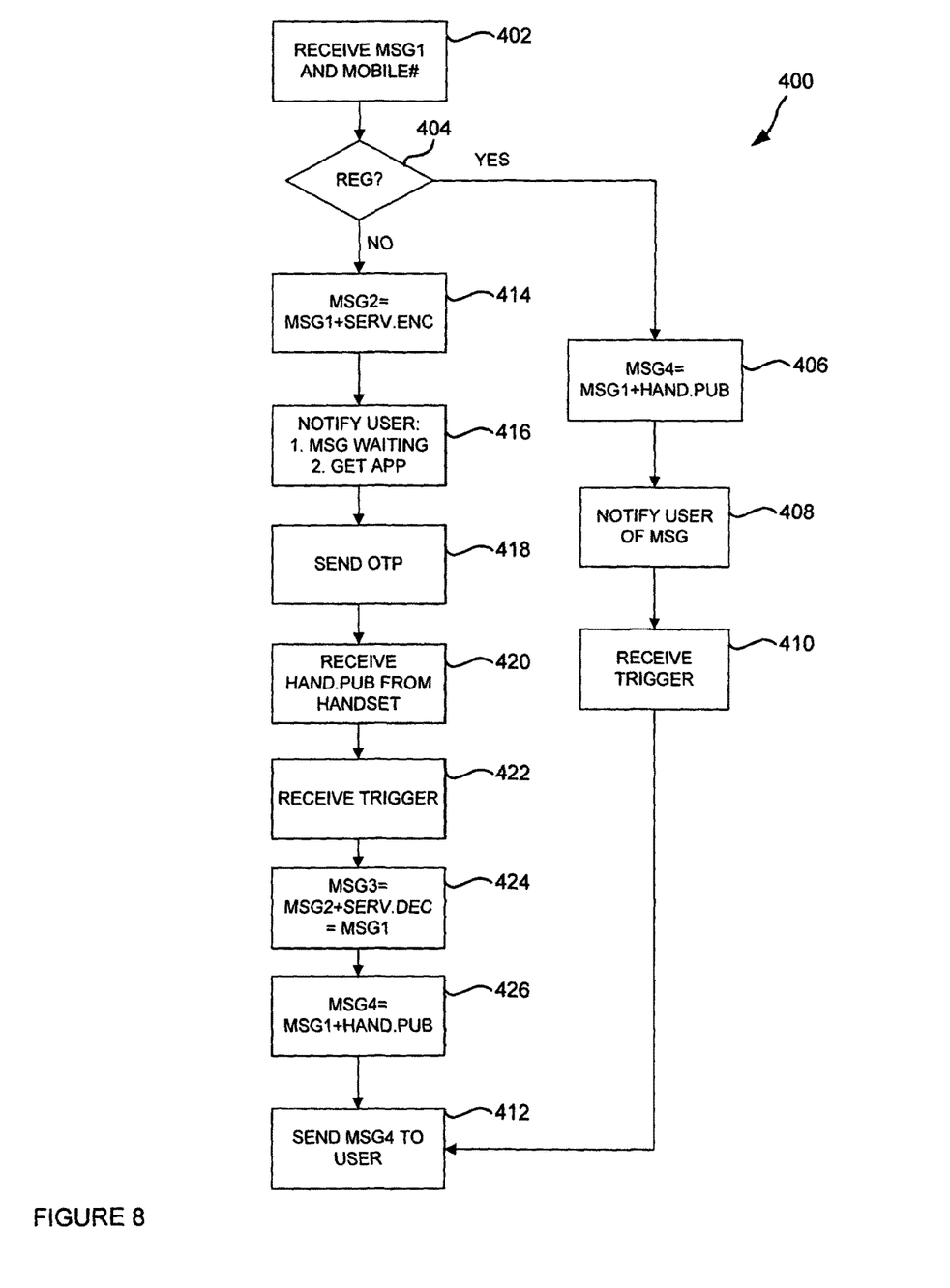
FIG. 8 is a flow diagram of the functions performed by the messaging server, in accordance with the registration functions of the example embodiment of FIG. 3.

The functionality supported by the messaging server 106 may be understood with reference to FIG. 8 which shows a flow diagram 400 of the steps performed at the messaging server 106, with reference to the example embodiment of FIG. 3.

At step 402 the messaging server 106 receives an unencrypted message from a sender computer 102 together with the mobile number of the recipient handset 104 to which the message is to be sent. At step 404 the messaging server 106 checks the database that the messaging server 106 maintains to determine whether the recipient handset 104 associated with the mobile number is already registered. If the handset is already registered, then at step 406 the messaging server 106 encrypts the received unencrypted message (Msg1) using the handset public key that the messaging server 106 has already saved together with the registration data associated with the prior registered handset. At step 408 the messaging server 106 sends an SMS to the handset 104 to notify the recipient that a message is waiting. Once the recipient attempts to access the waiting message, a trigger is sent to the messaging server 106 at step 410 to prompt the messaging server 106 to send the message. At step 412 the encrypted message (Msg4) is delivered to the handset application.

In a variation the message is encrypted (step 406) after the user is notified of the waiting message (step 408). In yet another variation, the message is encrypted (step 406) after the user has been notified (step 408) but before the messaging server 106 receives the trigger to send the encrypted message (step 410).

If, at step 404 the messaging server 106 checks the database that the messaging server 106 maintains to determine whether the recipient handset 104 associated with the mobile number is already registered and determines that it is not, then the messaging server 106 provides intermediate encryption to the message. At step 414 the received unencrypted message (Msg1) is encrypted using the messaging server encryption key. At step 416 the messaging server 106 sends a notification to the handset 104 indicating that there is an encrypted message waiting and providing details for downloading the required handset application. At step 418 the messaging server 106 sends an OTP to the handset 104 via SMS.

The authentication of the handset 104 may occur either at the messaging server 106, in which case the handset application is to prompt the user to enter the OTP as received via SMS, or may occur at the handset, in which case the OTP is to be sent to the handset application via a data communication network.

Irrespective, once the recipient handset 104 has been authenticated and registered, then at step 420 the messaging server 106 receives the handset public key from the handset application. At step 422 the messaging server 106 receives a trigger from the handset application that prompts the messaging server 106 to send the message to the handset 104. The messaging server 106 then decrypts the intermediate encrypted message Msg2 using the server decryption key, and again encrypts the message this time using the handset public key (step 410). At step 412 the encrypted message (Msg4) is delivered to the handset application.

In another embodiment, the intermediate encrypted message Msg2 is decrypted (step 424) and encrypted using the handset public key (step 510) to provide encrypted message Msg4, after the messaging server 106 receives the handset public key from the application server (step 520). In such an embodiment, the messaging server 106 stores the message in the final encrypted form (Msg4) until a trigger is received (step 422).

Although not shown, it follows from all the descriptions above, that the step 418 described with reference to FIG. 8 may be replaced by a step of receiving an SMS comprising the OTP from the handset and receiving, through a data communication network, an handset identifier entered by the user with the OTP generated by the handset application. With all this information at hand, the messaging server 106 is equipped to compare pairs of OTP/mobile numbers thereby to authenticate and register the handset 104. This is in line with the descriptions above.

The system and method described herein have a number of advantages including:

should the messaging server be compromised, messages sent to all the handsets cannot be decrypted because the private keys are not known at the messaging server 106;

should a handset 104 be compromised, only that recipient's messages are compromised and the application can re-establish a new public/private key for that recipient (for example using a different seed for the random number generator to obtain the keys, instead of using the mobile number);

all handsets are validated via a temporary password such as a one time password associated with the handset, thereby improving the security of the system;

the sending computer does not need to pre-indicate to a recipient that a handset application is required to receive the encrypted message; and a handset does not need to be pre-registered for a sending computer to send an encrypted message to the handset. As such, message recipients do not need to download nor register the handset application until an encrypted message is to be retrieved.

It will be understood that the invention disclosed and defined in this specification extends to all alternative combinations of two or more of the individual features mentioned or evident from the text or drawings. All of these different combinations constitute various alternative aspects of the invention.

What is claimed is:

1. A method for transmitting an encrypted message from a messaging server to a handset comprising:
    receiving, from a sender computer, at the messaging server, a message to be sent to the handset and a Mobile Station International Subscriber Directory Number (MSISDN) of the handset;
    determining, at the messaging server, that the handset is not registered with the messaging server;
    facilitating, at the messaging server, the registration of the handset by:
        sending a notification to the handset requesting registration,
        receiving a temporary password and an instance of the MSISDN of the handset from the handset,
        authenticating the MSISDN if the received temporary password matches a second temporary password,
        receiving from the handset a handset encryption key for storage with the MSISDN, wherein the handset encryption key is a public key generated based at least in part on the MSISDN during asymmetric key generation by a handset application installed on or native to the handset, and
        storing the handset encryption key against the MSISDN at the messaging server;
    encrypting, at the messaging server, the received message using the public handset encryption key; and
    sending the encrypted message to the handset to be decrypted by a private key corresponding to the received public key, the private key generated based at least in part on the MSISDN and generated by the handset application, the private key stored on the handset and neither transmitted to nor stored on the messaging server in any form.

2. A method as claimed in claim 1 wherein determining that the handset is not registered comprises determining that the MSISDN does not have an associated handset encryption key stored at the messaging server.

3. A method as claimed in claim 1 further comprising performing intermediate encryption of the message to create an intermediate encrypted message and storing the intermediate encrypted message at the messaging server.

4. A method as claimed in claim 3 wherein the intermediate encryption uses a messaging server encryption key.

5. A method as claimed in claim 3 wherein the method further comprises decrypting the intermediate encrypted message before encrypting the message with the handset encryption key.

6. A method as claimed in claim 1 wherein the asymmetric keys are generated by a random number generator of the handset application, seeded at least in part by the MSISDN.

7. A method for transmitting an encrypted message from a messaging server to a handset comprising:
    receiving, from a sender computer, at the messaging server, a message to be sent to the handset and a handset identifier that identifies the handset;
    wherein the handset identifier is a Mobile Station International Subscriber Directory Number (MSISDN);
    determining, at the messaging server, that the handset is not registered with the messaging server;
    facilitating, at the messaging server, the registration of the handset by:
        sending a notification to the handset requesting registration using the handset identifier and a temporary password generated by the messaging server,
        receiving a return handset identifier and a return password from a handset application installed on or native to the handset, and
        comparing the temporary password and the return password thereby to authenticate the handset identifier,
        receiving from the handset a handset encryption key for storage with the handset identifier, wherein the handset encryption key is a public key generated during asymmetric key generation by the handset application, and
        storing the handset encryption key against the handset identifier at the messaging server;
    encrypting, at the messaging server, the received message using the public handset encryption key; and
    sending the encrypted message to the handset to be decrypted after receipt thereof by a private key corresponding to the received public key, the private key associated with the handset identifier and generated by the handset application, the private key stored on the handset and neither transmitted to nor stored on the messaging server in any form.

8. A method as claimed in claim 7 wherein different communication channels are used for providing the temporary password to the handset and receiving the return password back from the handset.

9. A method as claimed in claim 8 wherein the temporary password is sent to the handset as part of an SMS, while the return password is received from the handset using a public mobile network supporting data communication.

10. A method as claimed in claim 7 wherein authenticating the handset further comprises comparing a handset identifier received with the return password, with the handset identifier to which the temporary password was sent.

11. A method for transmitting an encrypted message from a messaging server to a handset comprising:
   receiving, from a sender computer, at the messaging server, a message to be sent to the handset and a handset identifier that identifies the handset;
   wherein the handset identifier is a Mobile Station International Subscriber Directory Number (MSISDN);
   determining, at the messaging server, that the handset is not registered with the messaging server;
   facilitating, at the messaging server, the registration of the handset by:
      sending a notification to the handset requesting registration,
      receiving a first temporary password from the handset, the first temporary password generated by a handset application installed on or native to the handset,
      receiving a return handset identifier and a second temporary password from the handset,
      comparing the first temporary password with the second temporary password thereby to authenticate the handset identifier,
      receiving from the handset a handset encryption key for storage with the handset identifier, wherein the handset encryption key is a public key generated during asymmetric key generation by the handset application, and
      storing the handset encryption key against the handset identifier at the messaging server;
   encrypting, at the messaging server, the received message using the public handset encryption key; and
   sending the encrypted message to the handset to be decrypted after receipt thereof by a private key corresponding to the received public key, the private key associated with the handset identifier and generated by the handset application, the private key stored on the handset and neither transmitted to nor stored on the messaging server in any form.

12. A method as claimed in claim 11 wherein different communication channels are used for receiving the first and second temporary password from the handset, with the one channel being a public mobile network supporting data communication and the other channel being an SMS channel.

13. A method as claimed in claim 12 wherein the first temporary password is automatically transmitted over a public mobile network supporting data communication from the handset once it has been generated by the handset application program, and is transmitted with the handset identifier entered by the user through the handset application.

14. A method as claimed in claim 13 wherein the second temporary password is obtained along with the handset identifier as an SMS sent to the messaging server from the handset application, the SMS being sent automatically, without user interaction, from the handset application.

15. A computer system comprising:
   a memory;
   a processor; and
   instructions stored in the memory and configured to be executed by the processor to perform:
      receiving, from a sender computer, a message to be sent to the handset and a Mobile Station International Subscriber Directory Number (MSISDN) of the handset;
      determining that the handset is not registered with the messaging server;
      facilitating the registration of the handset by:
         sending a notification to the handset requesting registration,
         receiving a temporary password and an instance of the MSISDN of the handset from the handset,
         authenticating the MSISDN if the received temporary password matches a second temporary password,
         receiving from the handset a handset encryption key for storage with the MSISDN, wherein the handset encryption key is a public key generated based at least in part on the MSISDN during asymmetric key generation by a handset application installed on or native to the handset, and
         storing the handset encryption key against the MSISDN at the messaging server; and
      encrypting the received message using the public handset encryption key and sending the encrypted message to the handset to be decrypted by a private key corresponding to the received public key, the private key generated based at least in part on the MSISDN and generated by the handset application, the private key stored on the handset and neither transmitted to nor stored on the messaging server in any form.

16. A method for registering a handset to enable the secure sending of a message to the handset, the method comprising:
   receiving, from a handset application installed on or native to the handset, a first instance of a handset identifier that identifies the handset;
   wherein the handset identifier is a Mobile Station International Subscriber Directory Number (MSISDN);
   generating, at the messaging server, a temporary password;
   transmitting the temporary password to the handset using the first instance of the handset identifier;
   receiving a return password from the handset along with a second instance of the handset identifier;
   comparing the temporary password with the return password to authenticate the handset identifier;
   in the event that the temporary password and the return password match, transmitting an authentication acknowledgement back to the handset; and
   receiving an encryption key in the form of a handset encryption key that identifies a handset identifier, wherein the handset encryption key is a public key generated during asymmetric key generation by a handset application installed on or native to the handset, which key is stored at the messaging server against the handset identifier, with the corresponding private encryption key generated by the handset application stored ont eh handset and not stored on or transmitted to the messaging server in any form.

17. A method for registering a handset to enable the secure sending of a message to the handset, the method comprising:
   receiving, at the messaging server, a first temporary password and a first instance of a handset identifier from a handset application installed on or native to the handset;
   wherein the handset identifier is a Mobile Station International Subscriber Directory Number (MSISDN);

receiving, at the messaging server, a second temporary password and a second instance of the handset identifier from the handset;

comparing the first and second temporary passwords with each other;

in the event of a match, transmitting an authentication acknowledgement back to the handset; and receiving an encryption key in the form of a handset encryption key that identifies the handset identifier of the handset, wherein the handset encryption key is a public key generated using the handset identifier during asymmetric key generation by the handset application, which key is stored at the messaging server against the handset identifier, with the corresponding private encryption key generated by the handset application and stored on the handset and not stored on or transmitted to the messaging server in any form.

* * * * *

UNITED STATES PATENT AND TRADEMARK OFFICE
CERTIFICATE OF CORRECTION

PATENT NO. : 9,756,021 B2
APPLICATION NO. : 14/357417
DATED : September 5, 2017
INVENTOR(S) : Richard Francis Favero It is certified that error appears in the above-identified patent and that said Letters Patent is hereby corrected as shown below:

In Column 16 at Line 39, delete "the" and insert -- a --
In Column 16 at Line 57, delete "encryption"
In Column 16 at Line 58, delete "ont eh" and insert -- on the --
In Column 16 at Line 62, delete "the" and insert -- a --
In Column 17 at Line 15, delete "encryption"

Signed and Sealed this
Twenty-fifth Day of December, 2018

Andrei Iancu
*Director of the United States Patent and Trademark Office*